United States Patent
Yamanashi

[11] Patent Number: 4,709,998
[45] Date of Patent: Dec. 1, 1987

[54] TELEPHOTO LENS SYSTEM

[75] Inventor: Takanori Yamanashi, Tokyo, Japan

[73] Assignee: Olympus Optical Co., Ltd., Tokyo, Japan

[21] Appl. No.: 741,222

[22] Filed: Jun. 4, 1985

[30] Foreign Application Priority Data

Jun. 8, 1984 [JP] Japan .................. 59-116574

[51] Int. Cl.$^4$ .................................... G02B 9/00
[52] U.S. Cl. ........................................ 350/454
[58] Field of Search ............. 350/454, 455, 456

[56] References Cited

U.S. PATENT DOCUMENTS

| | | | |
|---|---|---|---|
| 3,942,875 | 3/1976 | Betensky | 350/454 |
| 3,942,876 | 3/1976 | Betensky | 350/454 |
| 4,240,703 | 12/1980 | Momiyama | 350/454 |

FOREIGN PATENT DOCUMENTS 48-38138   6/1973   Japan .

*Primary Examiner*—Bruce Y. Arnold
*Assistant Examiner*—P. M. Dzierzynski
*Attorney, Agent, or Firm*—Cushman, Darby & Cushman

[57] ABSTRACT

A telephoto lens system comprising, in the order from the object side, a first lens unit having positive refractive power, a second lens unit having negative refractive power, a third lens unit having positive refractive power, and a fourth lens unit having negative or positive refractive power, the telephoto lens system being arranged to be focused by integrally moving the first through the third lens unit and arranged that the secondary spectrum is corrected extremely favorably, and the variation of aberrations to be caused is small when the lens units are moved for the purpose of focusing, the telephoto lens system being small in size and having high performance.

7 Claims, 10 Drawing Figures

TELEPHOTO LENS SYSTEM

BACKGROUND OF THE INVENTION

1. Field of the invention:

The present invention relates to a telephoto lens system and, more particularly, to a compact and high-performance telephoto lens system with a field angle about 12° to 14° and aperture ratio about F/3.5 of which variation of aberrations to be caused is small when the lens system is focused from an object at the infinite distance onto an object at a short distance.

2. Description of the prior art:

Though zoom lens systems are becoming remarkably popular in these days, there is also an increasing demand for photographic lens systems of which the focal length is not variable.

As a recent tendency regarding telephoto lens systems, there is a demand for a telephoto lens system with a large aperture ratio and high performance. Generally, for large-sized lens systems, the inner focusing method to focus the lens system by moving a lens component, which is arranged in the inner part of the lens system, along the optical axis is adopted from the view point of convenience in operation. However, the inner focusing method has disadvantages as described below. That is, when the inner focusing method is adopted, spherical aberration of the lens system becomes undercorrected when it is focused on an object at a short distance in spite of the fact that the amount of lens component movement at that time is small. As a result, the quality of image in the central portion of image becomes unfavourable and, moreover, the contrast of image decreases due to variation of chromatic aberration. The above-mentioned disadvantages become more conspicuous when the field angle of the lens system is made larger.

On the other hand, U.S. Pat. No. 3,942,875 and U.S. Pat. No. 3,942,876 (Japanese published unexamined patent application No. 38138/73) disclose so-called semi-telephoto lens systems with field angles about 18° to 27° which can be focused up to an object at a comparatively short distance and, at the same time, of which variation of aberrations is small.

In the above-mentioned patents, telephoto lens systems with field angles about 12° are disclosed as embodiments. However, in case of said known telephoto lens systems, curvature of field and chromatic aberration which have serious influence on the performance of telephoto lens systems are not corrected satisfactorily.

Besides, generally known telephoto lens systems are designed on the basis of the state that the lens system is focused on an object at the infinite distance and are arranged to be focused by moving the lens system as a whole along the optical axis. When the above-mentioned focusing method is adopted, variation of spherical aberration becomes comparatively small but astigmatism becomes considerably undercorrected. It is difficult to correct the above-mentioned offaxial aberration. To correct said offaxial aberration, it is known to adopt so-called floating method which is often adopted for wide-angle lens systems in order to prevent variation of aberrations to be caused at the time of focusing, i.e., the method to prevent said variation of aberrations by varying some of airspaces in the lens system at the time of focusing, for example, the airspace where the stop is arranged. However, the floating method has disadvantages that the lens moving mechanism becomes complicated and the cost of production becomes high.

SUMMARY OF THE INVENTION

It is, therefore, a primary object of the present invention to provide a telephoto lens system with the field angle about 12° to 14° and aperture ratio about F/3.5 which is arranged that the quality of image when focused on an object at the infinite distance is extremely favourable and, at the same time, variation of aberrations is small even when focused on an object at a short distance and which is small in size and has high performance.

To make a telephoto lens system small in size, i.e., to make the telephoto ratio small, it is necessary to make refractive powers of respective lens groups constituting the lens system strong. However, it is widely known that, as a result, it becomes difficult to correct aberrations favourably.

To arrange that a lens system comprising a front lens group having positive refractive power and a rear lens group having negative refractive power in the order from the object side and generally called a telephoto type lens system has a small telephoto ratio, refractive power of each of said front lens group and rear lens group should be made strong. However, when positive refractive power of the front lens group, wherein heights of rays are large when rays enter respective lens surfaces, is made stronger, the value of chromatic aberration to be caused becomes increasingly large and, moreover, residual values of aberrations other than chromatic aberration also become larger. It is difficult to correct them by the rear lens group which has negative refractive power. Therefore, variation of aberrations when focused on an object at a short distance also becomes large, both of flatness of image surface and imaging performance become unfavourable, and contrast and sharpness of image decreases.

To eliminate the above-mentioned disadvantages of telephoto lens systems, the telephoto lens system according to the present invention is arranged as described below. That is, firstly to prevent increase of chromatic aberration and aggravation of other aberrations to be caused by making the telephoto ratio small, the telephoto lens system according to the present invention is arranged to adopt adequate distribution of refractive powers and adequate lens composition and, moreover, to select adequate glass materials. Secondly, to minimize the variation of aberrations to be caused when focusing the lens system on an object at a short distance, the optimum focusing method is adopted by taking the optical specifications (overall length of lens system, field angle, etc.) and convenience in operation into consideration.

The telephoto lens system according to the present invention is arranged to comprise, as shown in FIG. 1 for example, a first lens unit having positive refractive power, a second lens unit having negative refractive power, a third lens unit having positive refractive power, and a fourth lens unit having positive or negative refractive power, in the order from the object side, and is arranged to be focused by integrally moving the first lens unit I, the second lens unit II and the third lens unit III along the optical axis, the telephoto lens system according to the present invention being further arranged to fulfill the conditions (1) and (2) shown below:

$$0.35 < f_I/f < 0.5 \tag{1}$$

$$0.9 < \beta_{IV} < 1.2 \tag{2}$$

where, reference symbol f represents the focal length of the lens system as a whole, reference symbol $f_I$ represents the focal length of the first lens unit, and reference symbol $\beta_{IV}$ represents the lateral magnification of the fourth lens unit.

The lens system according to the present invention is arranged as a telephoto type lens system comprising a front lens group having positive refractive power and a rear lens group having negative refractive power wherein the front lens group comprises the first lens unit and the rear lens group comprises the second, third and fourth lens units.

The lens system according to the present invention is arranged to comprise four lens units as mentioned in the above in order to compose the lens system so that the residual aberrations caused by the first lens unit can be corrected satisfactorily by means of the second, third and fourth lens units even when the refractive power of the first lens unit is made strong so as to make the telephoto ratio small. Respective lens units are arranged to have the above-mentioned functions respectively so that the function to correct aberrations will not be largely assigned to a particular lens unit.

That is, the first lens unit I which should have strong refractive power is arranged to have an adequate lens configuration as described later in order to thereby correct chromatic aberration favourably so that chromatic aberration will become large even when it is enlarged by the second lens unit II, the third lens unit III and the fourth lens unit IV which have negative refractive power as a whole.

The second lens unit II having negative refractive power is arranged on the image side of the first lens unit I in order to arrange as described below in addition to correct aberration farourably, i.e., when the first lens unit I through the third lens unit III are regarded as one lens system, the back focal length of said lens system is thereby made long so that the distance from the object point for the fourth lens unit IV, which is arranged on the image side of said lens system, to the fourth lens unit IV is thereby made long so as to make it easy to correct aberrations of the fourth lens unit IV.

When the lens system according to the present invention is focused on an obejct at the infinite distance, the fourth lens unit IV can be regarded as a part of the third lens unit III. The third lens unit III and the fourth lens unit IV are arranged that both of said lens units as a whole have the function to farourably correct the residual aberrations cuased by the first lens unit I and the second lens unit II and, even when the refractive power of the first lens unit I is made strong, the third and fourth lens units are capable of favourably correcting aberrations caused by the first lens unit I.

When focusing the lens system accoridng to the present invention on an object at a short distance, the fourth lens unit IV is kept fixed in respect to the image surface and has the function to correct spherical aberration and astigmatism, which are extremely undercorrected by the first lens unit I through the third lens unit III, the lens system according to the present invention being thereby arranged to eliminate the disadvantage, i.e., extreme undercorrection of curvature of field, which occurs in case of known lens systems arranged to be focused by moving the lens system as a whole.

Besides, the lens system according to the present invention is arranged that the variation of aberrations to be caused at the time of focusing is made small by arranging that the residual aberrations to be caused by the first lens unit I, the second lens unit II and the third lens unit III are made satisfactorily small.

As described so far, the present invention enables to materialize a telephoto lens system arranged that the quality of image when focused on an object at the infinite distance is extremely favourable and variation of aberrations at the time of focusing is small in spite of the fact that the telephoto ratio is small.

The telephoto lens system according to the present invention has the lens composition described so far and is arranged to fulfill the conditions (1) and (2) shown before.

The condition (1) defines the refractive power of the first lens unit which is necessary and sufficient for the lens system according to the present invention for making the telephoto ratio small and, at the same time, for reducing aberrations to be caused by the first lens unit having positive refractive power.

If $f_I/f$ is made smaller than the lower limit of the condition (1), the refractive power of the first lens unit becomes very strong, and it is difficult to correct aberrations. Especially, chromatic aberration becomes unfavourable, and so-called secondary spectrum occurs largely. Therefore, even though the lens system can be made small in size, it is difficult to correct aberrations of the lens system as a whole in well balanced state. When $f_I/f$ is made larger than the upper limit of the condition (1), it is advantageous for correction of aberrations. However, it is difficult to obtain the desired value of telephoto ratio, and it is impossible to attain the object of the present invention.

The condition (2) defines the lateral magnification of the fourth lens unit. If $\beta_{IV}$ is made smaller than the lower limit of the condition (2), the total focal length of the first lens unit I up to the third lens unit III becomes long, and the amount of movement of the first through the third lens units increases when focusing on an object at a short distance. As a result, the operability of the lens system becomes unfavourable. Moreover, refractive powers of respective lens units become weak. As a result, it becomes difficult to make the telephoto ratio small, and this is contrary to the object of the present invention. When $\beta_{IV}$ is made larger than the upper limit of the condition (2), the total focal length of the first through the third lens units becomes short, and it is possible to make the telephoto ratio smaller. Besides, the amount of movement of the first through the third lens units when focusing on an object at a short distance becomes small. However, it becomes difficult to correct aberrations. Moreover, as the aperture ratio of the first lens unit I up to the third lens unit III becomes very large, it is disadvantageous for correction of aberrations, and aberrations to be caused by those lens units become large. To correct said aberrations, it is necessary to increase the number of lens elements constituting the fourth lens unit, and this is not desirable.

As described in the above, by selecting $\beta_{IV}$ within the range defined by the condition (2), it is possible to easily correct aberrations of the lens system as a whole and, at the same time, it is possible to make residual aberrations of respective lens units small. Therefore, it is also possible to make the variation of aberrations at the time of focusing small.

In order to materialize a telephoto lens system which enables to attain the object of the present invention, it is very effective to arrange that respective lens units have the following lens configurations. That is, it is preferable to arrange that the first lens unit I comprises, in the order from the object side, two positive lens components respectively having convex surfaces on the object side, a biconcave lens component, and a positive meniscus lens component having a convex surface on the object side, the second lens unit II comprises a cemented doublet consisting of a positive lens element and a biconcave lens element, the third lens unit III comprises at least one positive lens component, and the fourth lens unit IV comprises a positive lens component and a negative lens component. Besides, it is preferable to arrange that the telephoto lens system according to the present invention further fulfills the conditions (3) through (7) shown below:

$$1.21 \leq \theta_{Ip} \leq 1.29, \ 60 \leq \nu_{Ip} \leq 95.5 \quad (3)$$

$$25 < \nu_{In} < 40 \quad (4)$$

$$1.43 < n_{Ip} < 1.65 \quad (5)$$

$$1.6 < n_{In} < 1.9 \quad (6)$$

$$0.1 < r_{IVa}/r_{IVb} < 1.3 \quad (7)$$

where, reference symbol $\theta$ represents the partial dispersion ratio $$\left( \frac{n_g - n_d}{n_F - n_C} \right)$$

of the positive lens component in the first lens unit I, reference symbol $\nu_{Ip}$ represents Abbe's number of the positive lens component in the first lens unit I for d-line, reference symbol $\nu_{In}$ represents Abbe's number of the negative lens component in the first lens unit I for d-line, reference symbol $n_{Ip}$ represents the refractive index of the positive lens component in the first lens unit I for d-line, reference symbol $n_{In}$ represents the refractive index of the negative lens component in the first lens unit I for d-like, reference symbol $r_{IVa}$ represents the radius of curvature of the surface on the negative lens compoennt side of the positive lens component in the fourth lens unit IV, and reference symbol $r_b$ represents the radius of curvature of the surface on the positive lens component side of the negative lens component in the fourth lens unit IV.

The first lens unit I has the lens configuration, for example, as shown in FIG. 1. The first lens unit I is arranged that the refractive power is alloted to respective lens components in order to thereby prevent the refractive powers of individual lens components from becoming strong so that the telephoto ratio can be made small without making the performance of the lens system unfavourable. Besides, by arranging that the surface on the image side of the positive lens component, which is located in the second position counting from the object side, in the first lens unit and the surface on the object side of the biconcave lens component in the first lens unit respectively have large radii of curvature, it is so arranged that the values of aberrations of higher order to be caused by said surfaces become adequate and, moreover, that the errors caused in the manufacturing process do not have much influence on the performance of the lens system.

In the portion where the incident heights of rays are high as in case of said first lens unit I, chromatic aberration occurs largely. Therefore, to arrange that the residual chromatic aberration of the first lens unit I becomes as small as possible even when the refractive power of said lens unit is made strong to some extent, it is important to adopt an adequate kind of glass material. The condition (3) is established in order to attain the above-mentioned purpose.

It is more preferable to arrange that the lens system fulfills the condition (3') shown below instead of the condition (3).

$$1.22 \leq \theta_{Ip} \leq 1.24, \ 60 \leq \nu_{Ip} \leq 95.5 \quad (3')$$

Glass materials which fulfill the condition (3') are expensive and, moreover, cause problems in working of lenses. However, it is not impossible to adopt such glass materials. Even when the glass material adopted does not fulfill the condition (3'), it is possible to correct the residual chromatic aberration favourably by means of the other lens components as far as said glass material fulfills the condition (3). Therefore, by arranging to fulfill the condition (3), it is possible to make chromatic aberration of the lens system favourable.

When it is arranged that the condition (3) is fulfilled by one or two positive lens components out of the positive lens components constituting the first lens unit, it is possible to correct chromatic aberration of the lens system favourably. However, when the refractive power of the first lens unit is made strong in order to make the telephoto ratio of the lens system still smaller, it is preferable to arrange that all of the positive lens components constituting the first lens unit fulfill the condition (3).

If the condition (3) is not fulfilled, it is difficult to eliminate chromatic aberration, especially the secondary spectrum, and it is impossible to obtain a lens system which has favourable performance.

The condition (4) defines the range of glass materials to be adopted for the negative lens component in the first lens unit I and is established in order to eliminate the secondary spectrum and, at the same time, to correct aberrations favourably. When Abbe's number $\nu_{In}$ is made smaller than the lower limit of the condition (4), it is advantageous for correction of aberrations other than chromatic aberration. However, it is difficult to correct the secondary spectrum, and it is difficult to obtain a lens system with favourable performance. When $\nu_{In}$ is made larger than the upper limit of the condition (4), it is advantageous for correction of the secondary spectrum. However, it is necessary to made the refractive powers of the positive lens components strong and, consequently, it becomes difficult to correct aberrations other than chromatic aberration. For correction of aberrations, it is preferable to make the refractive power of said negative lens component weak.

As for flatness of image surface, i.e., for correction of curvature of field, the positive lens components and negative lens components constituting the first lens unit I have large influence. It is necessary to select the refractive indices of respective lens components in the first lens unit I so that Petzval's sum becomes an adequate value when power distribution to respective lens components in the first lens unit I is maintained in the adequate state.

For this purpose, it is preferable to arrange respective lens components constituting the first lens unit I so that the refractive indices thereof fulfill the conditions (5) and (6) in addition to the fact that said lens components are arranged to fulfill the conditions (3) and (4).

Out of the conditions (5) and (6), the condition (5) relates to selection of glass materials for the positive lens components in the first lens unit I. Generally, for these lens components, it is preferable to use glass materials with lower refractive indices. Therefore, if $n_{Ip}$ is made larger than the upper limit of the condition (5), Petzval's sum becomes a large positive value. Consequently, curvature of field is undercorrected, and it is impossible to maintain favourable flatness of image surface. If $n_{Ip}$ is made smaller than the lower limit of the condition (5), it is almost impossible to select glass materials out of actually existing glass materials.

The condition (6) defines the refractive index $n_{In}$ of the negative lens component in the first lens unit I and is established in order to arrange that Petzval's sum becomes an adequate value. If $n_{In}$ is made larger than the upper limit of the condition (6), Petzval's sum of the lens system as a whole becomes a negative value with a large absolute value, and curvature of field is overcorrected. On the contrary, if $n_{In}$ is made smaller than the lower limit of the condition (6), Petzval's sum of the lens system as a whole becomes a large positive value. In either case, it is impossible to maintain favourable flatness of image surface. Actually, it is possible to correct curvature of field farourably by selecting glass materials which fulfill these conditions for respective lens components constituting the first lens unit I.

As described so far, the conditions (3) through (6) are necessary for correction of curvature of field and correction of the secondary spectrum which are important for making the imaging performance of a telephoto lens system favourable.

The second lens unit II having negative refractive power has the functions to adequately correct the residual aberrations caused by the first lens unit I having positive refractive power, i.e., undercorrected spherical aberration, undercorrected astigmatism, and undercorrected coma. Besides, by adopting an adequate combination of glass materials for the second lens unit II, it is also possible to make chromatic aberration to be caused satisfactorily small.

As described before, for elimination of chromatic aberration, it is preferable to arrange that all of the positive lens components in the first lens unit fulfill the condition (3). However, for elimination of chromatic aberration, it is more effective to arrange that the lens elements constituting the second lens unit II fulfill the condition (8) shown below:

$$(\theta_{IIn} - \theta_{IIp})/(\nu_{IIn} - \nu_{IIp}) < -0.0031 \quad (8)$$

where, reference symbol $\theta_{IIn}$ represents the partial dispersion ratio of the biconcave lens element in the second lens unit II, reference symbol $\theta_{IIp}$ represents the partial dispersion ratio of the positive lens element in the second lens unit II, reference symbol $\nu_{IIn}$ represents Abbe's number of the biconcave lens element in the second lens unit II for d-line and reference symbol $\nu_{IIp}$ represents Abbe's number of the positive lens element in the second lens unit II for d-line.

By arranging that the respective lens elements constituting the second lens unit II fulfill the condition (8) shown in the above, it is possible to correct undercorrected paraxial chromatic aberration and overcorrected offaxial chromatic aberration which are caused by the first lens unit, and it is possible to correct other aberrations in well balanced state by means of the third lens unit III and the fourth lens unit IV. Here, as the second lens unit is arranged at a comparatively short distance from the first lens unit, the incident heights of rays are high and, therefore, a large effect is obtained by fulfilling the condition (8) shown in the above.

The third lens unit III is arranged that spherical aberration and astigmatism are undercorrected by it in order to correct said aberrations which are somewhat overcorrected chiefly by the second lens unti III. Besides, as coma is somewhat undercorrected, the third lens unit III is arranged to overcorrect coma so that coma is corrected in well balanced state. Furthermore, as distortion of large positive value is caused by the first lens unit I and cannot be corrected favourably by means of the second lens unit II only, the third lens unit III is also arranged to have the function to correct distortion.

When the third lens unit III is to be arranged to comprise one positive lens component, it is preferable to arrange it as a positive meniscus lens component which has a convex surface on the object side. When the above-mentioned lens configuration is adopted, negative distortion is caused and, therefore, it is effective for correction of pincushion distortion which tends to be caused by telephoto lens systems. Besides, to arrange that Petzval's sum of the lens system as a whole becomes an adequate value, it is effective to use a glass material with low refractive index and low despersion for the third lens unit III. This is preferable also for making the secondary spectrum small.

The fourth lens unit IV has relation to correction of aberrations at the time of focusing by using the focusing method adopted by the lens system according to the present invention. That is, when the first lens unit I through the third lens unit III are regarded as a focusing subsystem, the fourth lens unit IV has the functions to correct aberrations caused by said focusing subsystem. Especially, an important function of the fourth lens unit is to reduce the variation of astigmatism which is an important factor for maintaining favourable flatness of image surface. This will be evident from the fact that, in case of the focusing method to move the lens system as a whole, astigmatism is considerably undercorrected at the time of focusing, and the quality of image formed by offaxial rays decreases.

The telephoto lens system according to the present invention is arranged that, when focused on an object at the infinite distance, astigmatism is overcorrected by the first lens unit I through the third lens unit III, and said overcorrected astigmatism is corrected by arranging that negative astigmatism is caused by the fourth lens unit IV. On the other hand, when focused on an object at a short distance, astigmatism caused by the first lens unit I through the third lens unit III is undercorrected in the same way as spherical aberration, and said undercorrected astigmatism is corrected by arranging that positive astigmatism is caused by the fourth lens unit IV.

To make the fourth lens unit IV have the above-mentioned functions, the fourth lens unit IV is arranged to comprise a positive meniscus lens component which has a convex surface on the image side and a negative meniscus lens component which has a concave surface on the object side as described before. Thus, the above-mentioned functions are given to the convex surface on the image side of said positive meniscus lens component and the concave surface on the object side of said negative meniscus lens component which faces said convex surface with an air lens between. That is, said two surfaces cause not only aberrations of the third order but also aberrations of higher order. Moreover, as said two surfaces have refractive functions with signs (plus, minus) inverse to each other and have functions to mutually offset aberrations, it is possible to make aberrations caused by the fourth lens unit IV itself satisfactorily small and, at the same time, it is possible to correct the residual aberrations caused by the first lens unit I through the third lens unit III in well balanced state.

Generally, when glass materials for the first lens unit I are selected comparatively freely in cases of lens systems like the lens system according to the present invention, it is sometimes difficult to make Petzval's sum adequate. For example, when it is desired to correct spherical aberration and distortion in well balanced state by means of the positive lens components in the first lens unit I, glass materials with comparatively high refractive indices are often selected. Generally in such case, to obtain an adequate value of Petzval's sum, glass materials of lens components other than said lens components are also altered in most cases, but it is sometimes impossible to do so due to the reason that the actually existing glass materials fail to meet such requirement. However, in case of the telephoto lens system according to the present invention, it is possible to adopt glass materials for the positive meniscus lens component and the negative meniscus lens component constituting the fourth lens unit so that Petzval's sum of the lens system as a whole becomes an adequate value. This is very effective and important for maintaining favourable flatness of image surface of a telephoto lens system.

The condition (7) is established chiefly in order to correct spherical aberration and astigmatism of the fourth lens unit IV in well balanced state. If the value of $r_{IVa}/r_{IVb}$ is made larger than the upper limit of the condition (7), though the matter depends also on the state of the residual aberrations caused by the first lens unit I up to the third lens unit III, it is necessary to arrange that the surface on the object side of the negative meniscus lens component in the fourth lens unit IV causes overcorrected spherical aberration in order to offset undercorrected spherical aberration, which is caused by the surface on the image side of the positive lens component in the fourth lens unit I, by means of said surface on the object side of said negative meniscus lens component. In that case, spherical aberration of the lens system as a whole tends to be overcorrected, and it is difficult to correct aberrations of the lens system as a whole favourably. Besides, it is difficult to minimize the variation of aberrations to be caused at the time of focusing on an object at a short distance.

If the value of $r_{IVa}/r_{IVb}$ is made smaller than the lower limit of the condition (7), the aberration correcting function of the surface on the object side of the negative meniscus lens component in the fourth lens unit IV becomes insufficient, and spherical aberration of the lens system as a whole is undercorrected. Moreover, when the lens system is focused on an object at a short distance, aberrations of the first lens unit I through the third lens unit III are further undercorrected and, consequently, it is impossible to obtain favourable imaging performance when the lens system is focused on an object at a short distance.

For the telephoto lens system according to the present invention, it is also possible to arrange that the fourth lens unit IV comprises a negativ meniscus lens component which has a concave surface on the image side and a positive meniscus lens component which has a convex surface on the object side as illustrated by Embodiment 4 which is shown later. Furthermore, the fourth lens unit IV may be arranged to comprise a cemented doublet. In that case, however, the aforementioned aberration correcting function of the fourth lens unit IV becomes weak. Besides, when the focal length $f_{IV}$ of the fourth lens unit IV is arranged as $f_{IV}<0$, the amount of lens movement (amount of movement of the first through the third lens units) for focusing by the focusing method adopted for the lens system according to the present invention can be made more than about 10% smaller compared with the amount of movement required in case of the focusing method to move the lens system as a whole.

When the floating method, i.e., the method to reduce the variation of aberrations, which occurs at the time of focusing, by varying the airspace between the first lens unit I and the second lens unit II and the airspace between the second lens unit II and the third lens unit III, is adopted for the telephoto lens system according to the present invention, it is possible to make the variation of aberrations still smaller. However, when the floating method is adopted, a cam mechanism is required and the cost of production becomes higher. Therefore, when planning to adopt the floating method for the telephoto lens system according to the present invention, it is necessary to examine the plan by taking the cost also into consideration.

DETAILED DESCRIPTION OF THE PREFERRED EMBODIMENTS

Figure 1:
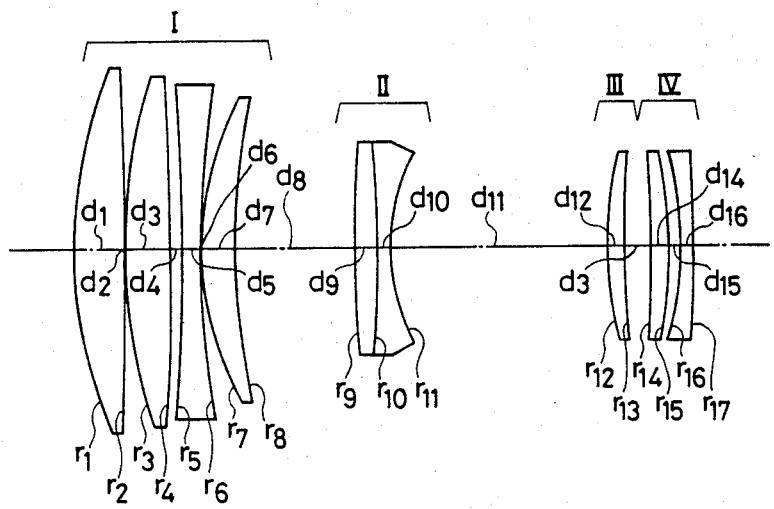
FIG. 1 shows a sectional view of Embodiments 1 through 3 of the telephoto lens system according to the present invention in the state that the lens system is focused on an object at the infinite distance.

Now, preferred embodiments of the telephoto lens system according to the present invention are shown below.

Embodiment 1

| $f = 100, F/3.6, 2\omega = 14°$ telephoto ratio 0.857 ||||
|---|---|---|---|
| $r_1 = 37.011$ | | | |
| $d_1 = 3.92$ | $n_1 = 1.48749$ | | $\nu_1 = 70.15$ |
| $r_2 = 728.935$ | | | |
| $d_2 = 0.17$ | | | |
| $r_3 = 44.498$ | | | |
| $d_3 = 3.98$ | $n_2 = 1.45600$ | | $\nu_2 = 90.31$ |
| $r_4 = -192.731$ | | | |
| $d_4 = 0.91$ | | | |
| $r_5 = -177.214$ | | | |
| $d_5 = 1.65$ | $n_3 = 1.67270$ | | $\nu_3 = 32.1$ |
| $r_6 = 84.509$ | | | |
| $d_6 = 0.17$ | | | |
| $r_7 = 26.500$ | | | |
| $d_7 = 2.67$ | $n_4 = 1.48749$ | | $\nu_4 = 70.15$ |
| $r_8 = 54.802$ | | | |
| $d_8 = 10.17$ | | | |
| $r_9 = 185.681$ | | | |
| $d_9 = 1.99$ | $n_5 = 1.80518$ | | $\nu_5 = 25.43$ |
| $r_{10} = -105.924$ | | | |
| $d_{10} = 0.97$ | $n_6 = 1.61250$ | | $\nu_6 = 44.90$ |
| $r_{11} = 16.356$ | | | |
| $d_{11} = 18.26$ | | | |
| $r_{12} = 32.629$ | | | |
| $d_{12} = 1.59$ | $n_7 = 1.51728$ | | $\nu_7 = 69.56$ |
| $r_{13} = 86.198$ | | | |
| $d_{13} = 2.16 \sim 10.71$ | | | |
| $r_{14} = -162.379$ | | | |
| $d_{14} = 1.65$ | $n_8 = 1.66446$ | | $\nu_8 = 35.71$ |
| $r_{15} = -36.411$ | | | |
| $d_{15} = 0.91$ | | | |
| $r_{16} = -33.495$ | | | |
| $d_{16} = 0.97$ | $n_9 = 1.67790$ | | $\nu_9 = 50.72$ |
| $r_{17} = -206.402$ | | | |

$f_I/f = 0.435, f_{IV} = -390.27$
$\theta_{Ip1} = 1.2212, \theta_{Ip2} = 1.2277, \theta_{Ip3} = 1.2212$
$\nu_{Ip1} = 70.15, \nu_{Ip2} = 90.31, \nu_{Ip3} = 70.15$
$\nu_{In} = 32.1, n_{Ip1} = 1.48749, n_{Ip2} = 1.45600$
$n_{Ip3} = 1.48749, n_{In} = 1.67270$
$(\theta_{IIn} - \theta_{IIp})/(\nu_{IIn} - \nu_{IIp}) = -0.00343$
$r_{IVa}/r_{IVb} = 1.087, \beta_{IV} = 1.081$

Embodiment 2

| $f = 100, F/3.6, 2\omega = 14°$ telephoto ratio 0.86 ||||
|---|---|---|---|
| $r_1 = 36.625$ | | | |
| $d_1 = 3.96$ | $n_1 = 1.48749$ | | $\nu_1 = 70.15$ |
| $r_2 = 586.183$ | | | |
| $d_2 = 0.11$ | | | |
| $r_3 = 48.338$ | | | |
| $d_3 = 4.83$ | $n_2 = 1.48605$ | | $\nu_2 = 81.81$ |
| $r_4 = -215.527$ | | | |
| $d_4 = 0.91$ | | | |
| $r_5 = -183.687$ | | | |
| $d_5 = 1.69$ | $n_3 = 1.68852$ | | $\nu_3 = 30.62$ |
| $r_6 = 96.184$ | | | |
| $d_6 = 0.11$ | | | |
| $r_7 = 25.745$ | | | |
| $d_7 = 2.57$ | $n_4 = 1.52855$ | | $\nu_4 = 76.96$ |
| $r_8 = 44.818$ | | | |
| $d_8 = 10.17$ | | | |
| $r_9 = 156.431$ | | | |
| $d_9 = 1.62$ | $n_5 = 1.77520$ | | $\nu_5 = 27.51$ |
| $r_{10} = -88.066$ | | | |
| $d_{10} = 0.49$ | $n_6 = 1.61340$ | | $\nu_6 = 43.84$ |
| $r_{11} = 16.301$ | | | |
| $d_{11} = 18.27$ | | | |
| $r_{12} = 32.062$ | | | |
| $d_{12} = 1.25$ | $n_7 = 1.51633$ | | $\nu_7 = 64.15$ |
| $r_{13} = 65.677$ | | | |
| $d_{13} = 2.10 \sim 12.12$ | | | |
| $r_{14} = -262.677$ | | | |
| $d_{14} = 1.31$ | $n_8 = 1.63636$ | | $\nu_8 = 35.37$ |
| $r_{15} = -36.253$ | | | |
| $d_{15} = 0.57$ | | | |
| $r_{16} = -33.05$ | | | |
| $d_{16} = 0.74$ | $n_9 = 1.61484$ | | $\nu_9 = 51.17$ |
| $r_{17} = -204.796$ | | | |

$f_I/f = 0.437, f_{IV} = -3049.23$
$\theta_{Ip1} = 1.2212, \theta_{Ip2} = 1.2321, \theta_{Ip3} = 1.2362$
$\nu_{Ip1} = 70.15, \nu_{Ip2} = 81.81, \nu_{Ip3} = 76.96$
$\nu_{In} = 30.62, n_{Ip1} = 1.48749, n_{Ip2} = 1.48605$
$n_{Ip3} = 1.52855, n_{In} = 1.68852$
$(\theta_{IIn} - \theta_{IIp})/(\nu_{IIn} - \nu_{IIp}) = -0.00324$
$r_{IVa}/r_{IVb} = 1.097, \beta_{IV} = 1.006$

Embodiment 3

| $f = 100, F/3.6, 2\omega = 12.6°$ telephoto ratio 0.86 ||||
|---|---|---|---|
| $r_1 = 38.086$ | | | |
| $d_1 = 3.92$ | $n_1 = 1.48749$ | | $\nu_1 = 70.15$ |
| $r_2 = 722.344$ | | | |
| $d_2 = 0.17$ | | | |
| $r_3 = 44.341$ | | | |
| $d_3 = 3.98$ | $n_2 = 1.49700$ | | $\nu_2 = 81.61$ |
| $r_4 = -184.266$ | | | |
| $d_4 = 0.91$ | | | |
| $r_5 = -169.021$ | | | |
| $d_5 = 1.65$ | $n_3 = 1.67270$ | | $\nu_3 = 32.10$ |
| $r_6 = 74.825$ | | | |
| $d_6 = 0.17$ | | | |
| $r_7 = 26.266$ | | | |
| $d_7 = 2.67$ | $n_4 = 1.48749$ | | $\nu_4 = 70.15$ |
| $r_8 = 56.149$ | | | |
| $d_8 = 10.17$ | | | |
| $r_9 = 200.934$ | | | |
| $d_9 = 1.73$ | $n_5 = 1.80518$ | | $\nu_5 = 25.43$ |
| $r_{10} = -93.087$ | | | |
| $d_{10} = 0.97$ | $n_6 = 1.61250$ | | $\nu_6 = 44.9$ |
| $r_{11} = 16.424$ | | | |
| $d_{11} = 18.28$ | | | |
| $r_{12} = 34.3$ | | | |
| $d_{12} = 1.59$ | $n_7 = 1.48749$ | | $\nu_7 = 70.15$ |
| $r_{13} = 104.99$ | | | |
| $d_{13} = 2.16 \sim 10.81$ | | | |
| $r_{14} = -180.05$ | | | |
| $d_{14} = 1.65$ | $n_8 = 1.63636$ | | $\nu_8 = 35.37$ |
| $r_{15} = -35.61$ | | | |
| $d_{15} = 0.91$ | | | |
| $r_{16} = -33.61$ | | | |
| $d_{16} = 0.97$ | $n_9 = 1.67790$ | | $\nu_9 = 50.72$ |
| $r_{17} = -213.17$ | | | |

$f_I/f = 0.424, f_{IV} = -428.8$
$\theta_{Ip1} = 1.2212, \theta_{Ip2} = 1.2319, \theta_{Ip3} = 1.2212$
$\nu_{Ip1} = 70.15, \nu_{Ip2} = 81.61, \nu_{Ip3} = 70.15$
$\nu_{In} = 32.1, n_{Ip1} = 1.48749, n_{Ip2} = 1.49700$
$n_{Ip3} = 1.48749, n_{In} = 1.67270$
$(\theta_{IIn} - \theta_{IIp})/(\nu_{IIn} - \nu_{IIp}) = -0.00343$
$r_{IVa}/r_{IVb} = 1.059, \beta_{IV} = 1.075$

Embodiment 4

| $f = 100, F/3.6, 2\omega = 14°$ telephoto ratio 0.853 ||||
|---|---|---|---|
| $r_1 = 38.488$ | | | |
| $d_1 = 3.62$ | $n_1 = 1.61800$ | | $\nu_1 = 63.38$ |
| $r_2 = 310.633$ | | | |

-continued $f = 100, F/3.6, 2\omega = 14°$
telephoto ratio 0.853

| | | | |
|---|---|---|---|
| $d_2 = 0.12$ | | | |
| $r_3 = 46.786$ | | | |
| $d_3 = 4.11$ | $n_2 = 1.49700$ | $\nu_2 = 81.61$ | |
| $r_4 = -178.696$ | | | |
| $d_4 = 0.91$ | | | |
| $r_5 = 161.08$ | | | |
| $d_5 = 1.59$ | $n_3 = 1.72047$ | $\nu_3 = 34.72$ | |
| $r_6 = 56.714$ | | | |
| $d_6 = 0.17$ | | | |
| $r_7 = 25.82$ | | | |
| $d_7 = 2.84$ | $n_4 = 1.51728$ | $\nu_4 = 69.56$ | |
| $r_8 = 74.838$ | | | |
| $d_8 = 10.14$ | | | |
| $r_9 = 206.927$ | | | |
| $d_9 = 1.62$ | $n_5 = 1.80518$ | $\nu_5 = 25.43$ | |
| $r_{10} = -101.213$ | | | |
| $d_{10} = 0.92$ | $n_6 = 1.61340$ | $\nu_6 = 43.84$ | |
| $r_{11} = 15.409$ | | | |
| $d_{11} = 17.97$ | | | |
| $r_{12} = 28.811$ | | | |
| $d_{12} = 1.59$ | $n_7 = 1.51633$ | $\nu_7 = 64.15$ | |
| $r_{13} = 56.276$ | | | |
| $d_{13} = 2.07 \sim 12.35$ | | | |
| $r_{14} = 114.385$ | | | |
| $d_{14} = 1.05$ | $n_8 = 1.72000$ | $\nu_8 = 50.25$ | |
| $r_{15} = 34.602$ | | | |
| $d_{15} = 0.45$ | | | |
| $r_{16} = 36.485$ | | | |
| $d_{16} = 1.48$ | $n_9 = 1.59270$ | $\nu_9 = 35.29$ | |
| $r_{17} = 346.055$ | | | |

$f_I/f = 0.423, f_{IV} = 7086.13$
$\theta_{Ip1} = 1.2401, \theta_{Ip2} = 1.2319, \theta_{Ip3} = 1.2254$
$\nu_{Ip1} = 63.38, \nu_{Ip2} = 81.61, \nu_{Ip3} = 69.56$
$\nu_{In} = 34.72, n_{Ip1} = 1.61800, n_{Ip2} = 1.49700$
$n_{Ip3} = 1.51728, n_{In} = 1.72047$
$(\theta_{IIn} - \theta_{IIp})/(\nu_{IIn} - \nu_{IIp}) = -0.00324$ -continued $f = 100, F/3.6, 2\omega = 14°$
telephoto ratio 0.853

$r_{IVa}/r_{IVb} = 1.054, \beta_{IV} = 0.9961$

In embodiments shown in above, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

Figure 2:
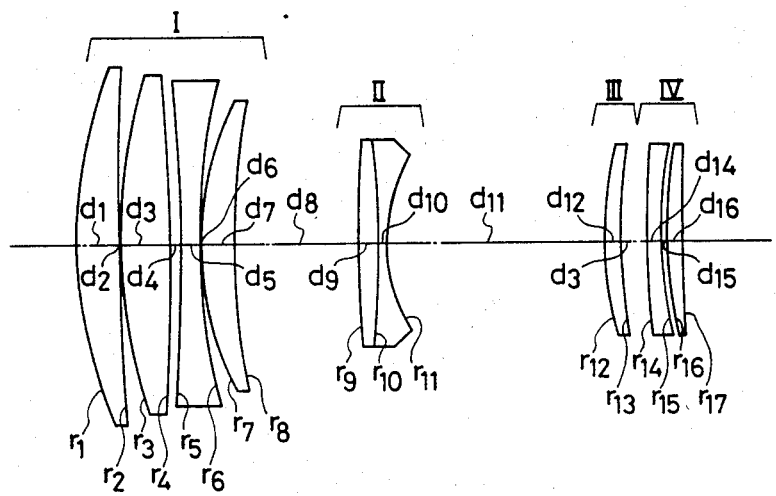
FIG. 2 shows a sectional view of Embodiment 4 of the telephoto lens system accoridng to the present invention in the state that the lens system is focused on an object at the infinite distance.
Figure 3:
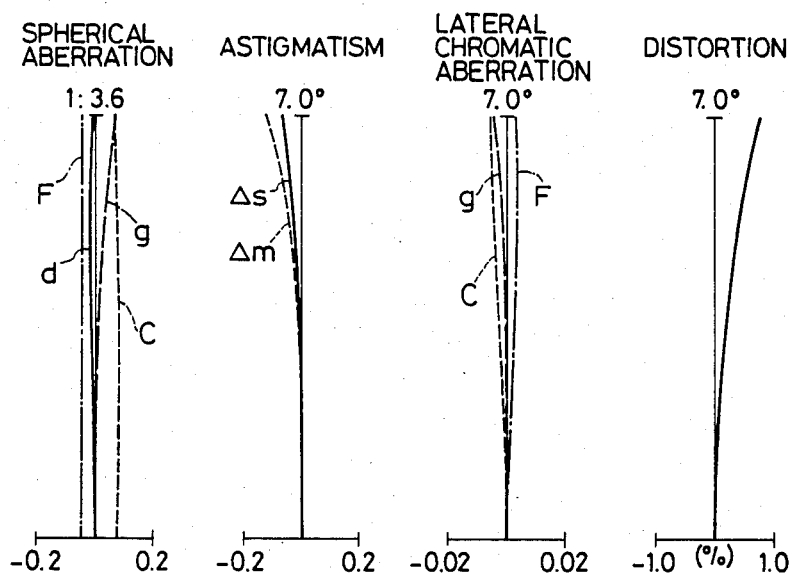
FIG. 3 shows graphs illustrating aberration curves of Embodiment 1 of the present invention when focused on an object at the infinite distance.
Figure 4:
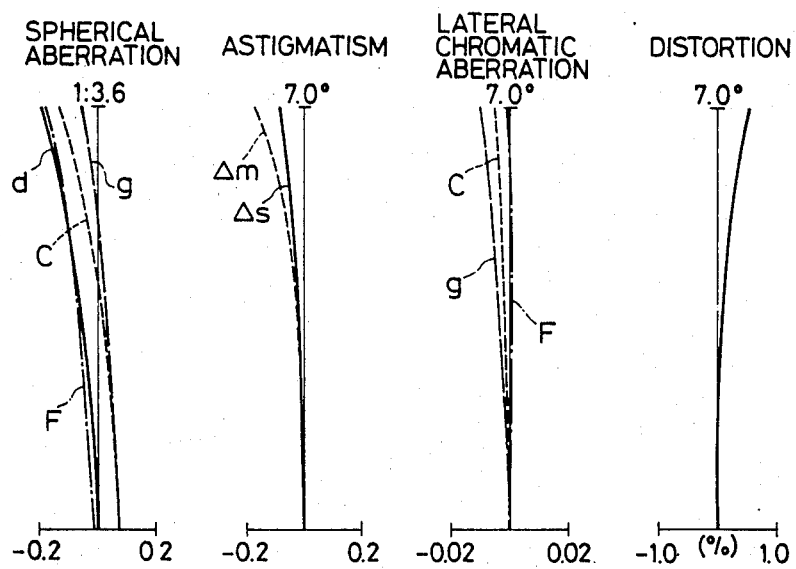
FIG. 4 shows graphs illustrating aberration curves of Embodiment 1 of the present invention when the photographing magnification is −1/10.
Figure 5:
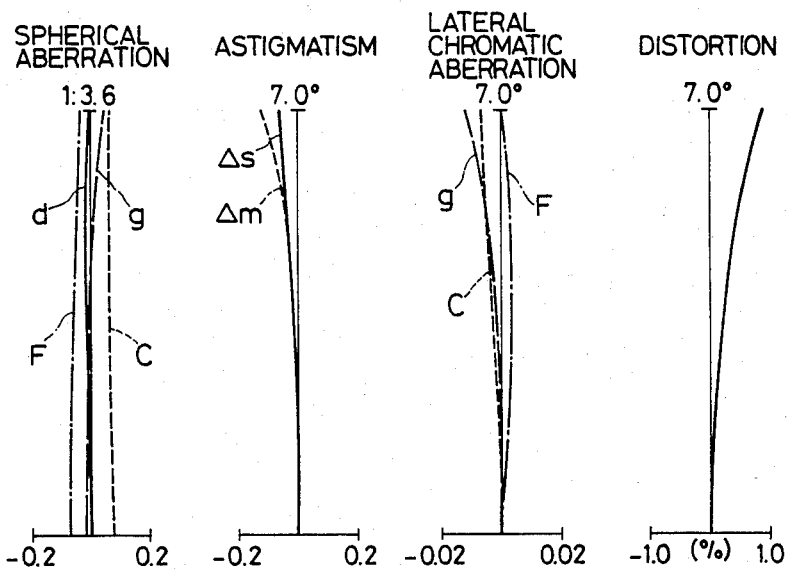
FIG. 5 shows graphs illustrating aberration curves of Embodiment 2 of the present invention when focued on an object at the infinite distance.
Figure 6:
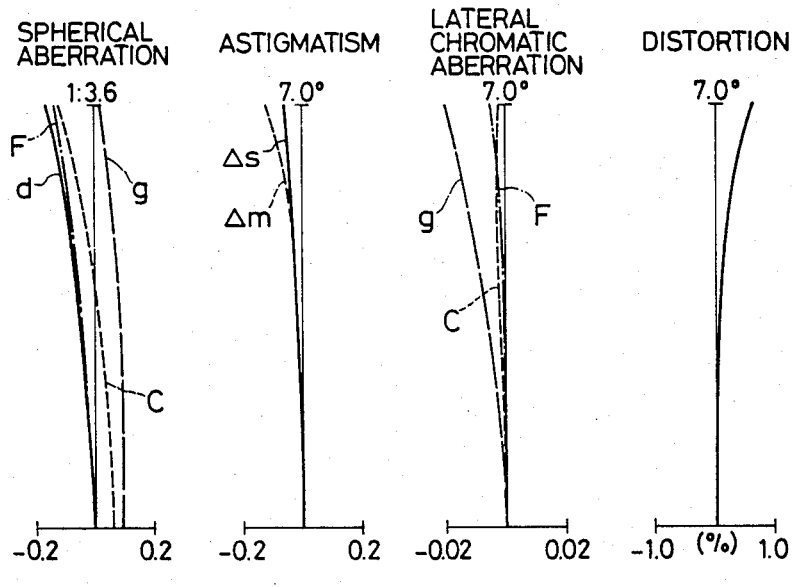
FIG. 6 shows graphs illustrating aberration curves of Embodiment 2 of the present invention when the photographing magnification is −1/10.
Figure 7:
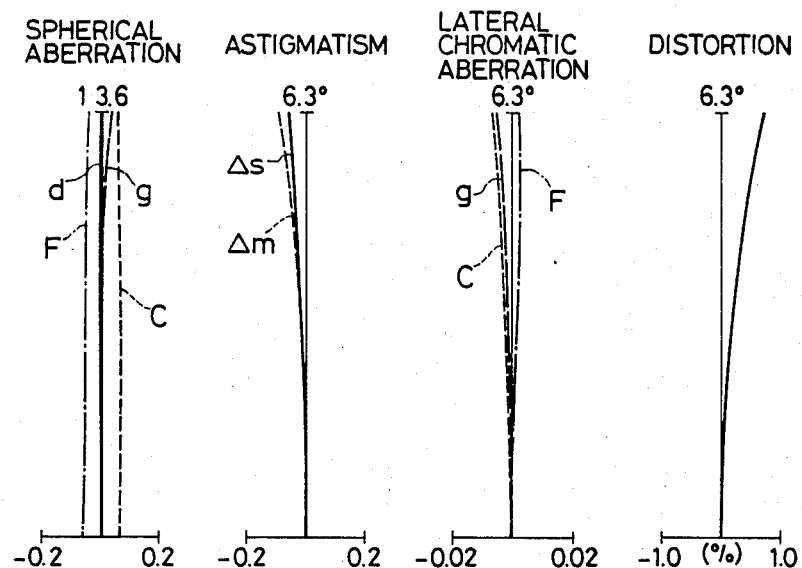
FIG. 7 shows graphs illustrating aberration curves of Embodiment 3 of the present invention when focused on an object at the infinite distance.
Figure 8:
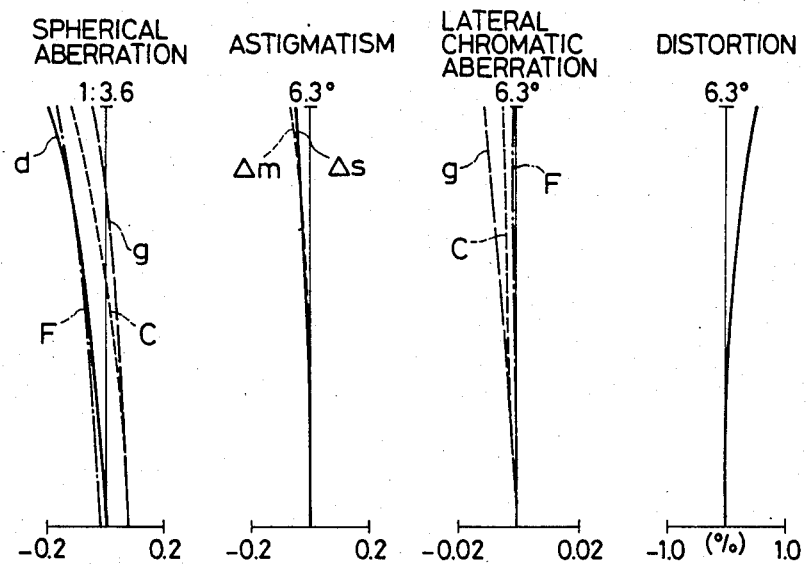
FIG. 8 shows graphs illustrating aberration curves of Embodiment 3 of the present invention when the photogrpahing magnification is −1/10.
Figure 9:
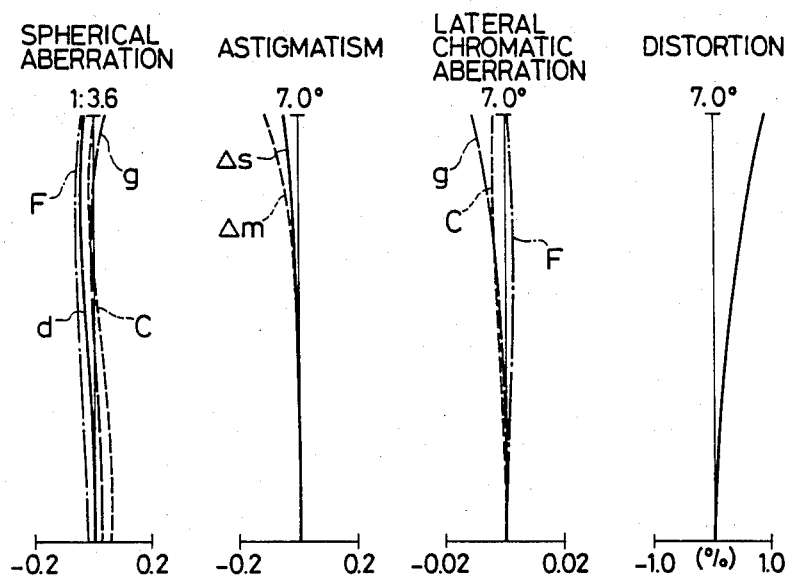
FIG. 9 shows graphs illustrating aberration curves of Embodiment 4 of the present invention when focused on an object at the infinite distance.
Figure 10:
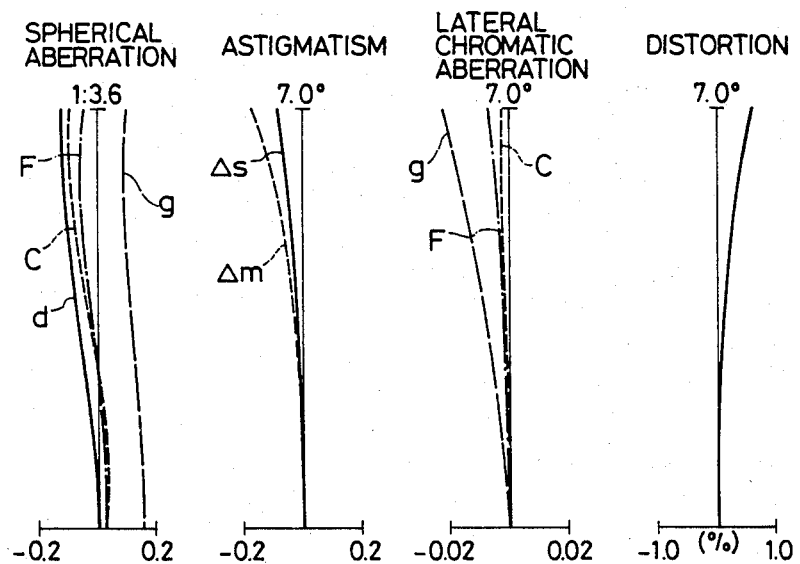
FIG. 10 shows graphs illustrating aberration curves of Embodiment 4 of the present invention when the photographing magnification is −1/10.

Out of respective embodiments shown in the above, Embodiments 1, 2 and 3 respectively have the lens configuration as shown in FIG. 1. Embodiment 4 has the lens configuration shown in FIG. 2. The lens system shown in FIG. 1 is arranged that the fourth lens unit IV comprises a positive meniscus lens component which has a convex surface on the image side and a negative meniscus lens component which has a concave surface on the object side while the lens system shown in FIG. 2 is arranged that the fourth lens unit I comprises a negative meniscus lens component which has a concave surface on the image side and a positive meniscus lens component which has a convex surface on the object side. All of said embodiments are arranged to be focused by integrally moving the first lens unit I, the second lens unit and the third lens unit III along the optical axis. Variation data of the airspace $d_{13}$ at the time of focusing are shown in the numerical data of respective embodiments.

Aberration coefficients of the third order of said embodiments are as given in the tables below.

TABLE 1(a)

| | SA3 | CMA3 | AST3 | DIS3 | PTZ3 | SAC | SLC |
|---|---|---|---|---|---|---|---|
| 1 | −0.16171 | 0.08512 | −0.00498 | 0.00540 | −0.02581 | −0.01682 | 0.00295 |
| 2 | −0.02962 | 0.11530 | −0.04986 | 0.06298 | 0.00131 | −0.00673 | 0.00873 |
| 3 | 0.00585 | 0.00930 | 0.00164 | −0.01001 | −0.02051 | −0.00407 | −0.00216 |
| 4 | −0.39992 | 0.94218 | −0.24663 | 0.19740 | −0.00474 | −0.01222 | 0.00959 |
| 5 | 0.48277 | −1.13020 | 0.29399 | −0.23458 | 0.00661 | 0.04443 | −0.03467 |
| 6 | −0.00381 | 0.03299 | −0.03172 | 0.05151 | 0.01387 | −0.00617 | 0.01779 |
| 7 | 0.00769 | 0.00346 | 0.00017 | −0.00538 | −0.03604 | −0.00957 | −0.00143 |
| 8 | −0.01941 | 0.10053 | −0.05785 | 0.06978 | 0.01743 | −0.00416 | 0.00718 |
| 9 | 0.12720 | −0.37661 | 0.12390 | −0.11537 | −0.00700 | 0.02732 | −0.02696 |
| 10 | −0.05689 | 0.11023 | −0.02373 | 0.01651 | −0.00182 | −0.02380 | 0.01537 |
| 11 | 0.04246 | 0.06513 | 0.01110 | 0.04028 | 0.06768 | 0.01518 | 0.00776 |
| | 0.0 | 0.0 | 0.0 | 0.0 | 0.0 | 0.0 | 0.0 |
| 12 | 0.00049 | 0.00671 | 0.01030 | −0.09277 | −0.03045 | −0.00145 | −0.00667 |
| 13 | −0.00293 | 0.02589 | −0.02544 | 0.04102 | 0.01153 | −0.00160 | 0.00471 |
| 14 | 0.01716 | −0.05432 | 0.01911 | −0.02772 | 0.00716 | 0.00724 | −0.00764 |
| 15 | −0.10702 | 0.03238 | −0.00109 | 0.00333 | −0.03195 | −0.01382 | 0.00139 |
| 16 | 0.10781 | −0.01907 | 0.00037 | −0.00210 | 0.03515 | 0.00950 | −0.00056 |
| 17 | −0.01153 | 0.04439 | −0.01898 | 0.03167 | −0.00570 | −0.00419 | 0.00538 |
| Σ | −0.00142 | −0.00659 | 0.00029 | 0.03198 | −0.00328 | −0.00093 | 0.00077 |

TABLE 1(b)

| | SA3 | CMA3 | AST3 | DIS3 | PTZ3 | SAC | SLC |
|---|---|---|---|---|---|---|---|
| 1 | −0.11220 | 0.05600 | −0.00311 | 0.00325 | −0.01643 | −0.01346 | 0.00224 |
| 2 | −0.01391 | 0.05772 | −0.02661 | 0.03566 | 0.00083 | −0.00480 | 0.00664 |
| 3 | 0.00322 | 0.00455 | 0.00071 | −0.00580 | −0.01306 | −0.00350 | −0.00164 |
| 4 | −0.22015 | 0.52327 | −0.13819 | 0.11187 | −0.00301 | −0.00924 | 0.00732 |
| 5 | 0.26631 | −0.62866 | 0.16489 | −0.13306 | 0.00421 | 0.03365 | −0.02648 |
| 6 | −0.00120 | 0.01343 | −0.01672 | 0.02946 | 0.00883 | −0.00364 | 0.01361 |
| 7 | 0.00125 | 0.00051 | 0.00002 | −0.00316 | −0.02294 | −0.00797 | −0.00110 |
| 8 | −0.00851 | 0.04934 | −0.03179 | 0.03999 | 0.01109 | −0.00285 | 0.00551 |
| 9 | 0.06805 | −0.20768 | 0.07042 | −0.06710 | −0.00446 | 0.02072 | −0.02108 |
| 10 | −0.03351 | 0.06457 | −0.01382 | 0.00962 | −0.00116 | −0.01877 | 0.01206 |
| 11 | 0.04327 | 0.05894 | 0.00892 | 0.02361 | 0.04308 | 0.01343 | 0.00610 |

TABLE 1(b)-continued

|    | SA3      | CMA3     | AST3     | DIS3     | PTZ3     | SAC      | SLC      |
|----|----------|----------|----------|----------|----------|----------|----------|
|    | 0.0      | 0.0      | 0.0      | 0.0      | 0.0      | 0.0      | 0.0      |
| 12 | −0.00006 | −0.00054 | −0.00053 | −0.05907 | −0.01938 | −0.00190 | −0.00564 |
| 13 | −0.00095 | 0.01102  | −0.01414 | 0.02617  | 0.00734  | −0.00104 | 0.00400  |
| 14 | 0.00637  | −0.02047 | 0.00731  | −0.01271 | 0.00456  | 0.00430  | −0.00461 |
| 15 | −0.03711 | −0.02030 | −0.00123 | −0.00393 | −0.02034 | −0.00801 | −0.00146 |
| 16 | 0.03722  | 0.02665  | 0.00212  | 0.00585  | 0.02238  | 0.00549  | 0.00131  |
| 17 | −0.00433 | 0.01770  | −0.00803 | 0.01588  | −0.00363 | −0.00249 | 0.00339  |
| Σ  | −0.00624 | 0.00606  | 0.00023  | 0.01653  | −0.00209 | −0.00008 | 0.00017  |

TABLE 2(a)

|    | SA3      | CMA3     | AST3     | DIS3     | PTZ3     | SAC      | SLC      |
|----|----------|----------|----------|----------|----------|----------|----------|
| 1  | −0.16688 | 0.19775  | −0.02604 | 0.02058  | −0.02608 | −0.01700 | 0.00671  |
| 2  | −0.02750 | 0.12698  | −0.06516 | 0.09779  | 0.00163  | −0.00652 | 0.01004  |
| 3  | 0.00485  | 0.00793  | 0.00144  | −0.00997 | −0.01972 | −0.00383 | −0.00209 |
| 4  | −0.37678 | 1.14232  | −0.38481 | 0.39336  | −0.00442 | −0.01354 | 0.01368  |
| 5  | 0.45625  | −1.37103 | 0.45777  | −0.46502 | 0.00647  | 0.04584  | −0.04592 |
| 6  | −0.00872 | 0.06175  | −0.04858 | 0.08549  | 0.01236  | −0.00937 | 0.02211  |
| 7  | 0.01094  | −0.00181 | 0.00003  | 0.00216  | −0.03914 | −0.00919 | 0.00051  |
| 8  | −0.00736 | 0.06070  | −0.05558 | 0.09091  | 0.02249  | −0.00250 | 0.00688  |
| 9  | 0.11351  | −0.41868 | 0.17158  | −0.20110 | −0.00802 | 0.02320  | −0.02852 |
| 10 | −0.04866 | 0.12248  | −0.03426 | 0.03013  | −0.00166 | −0.01893 | 0.01588  |
| 11 | 0.04583  | 0.03841  | 0.00358  | 0.01999  | 0.06796  | 0.01588  | 0.00444  |
|    | 0.0      | 0.0      | 0.0      | 0.0      | 0.0      | 0.0      | 0.0      |
| 12 | 0.00050  | 0.00596  | 0.00794  | −0.09200 | −0.03095 | −0.00173 | −0.00693 |
| 13 | −0.00104 | 0.01600  | −0.02723 | 0.06189  | 0.01511  | −0.00113 | 0.00579  |
| 14 | 0.01220  | −0.05515 | 0.02770  | −0.04824 | 0.00431  | 0.00644  | −0.00970 |
| 15 | −0.10975 | 0.10999  | −0.01225 | 0.01454  | −0.03126 | −0.01412 | 0.00472  |
| 16 | 0.11305  | −0.09938 | 0.00971  | −0.01268 | 0.03357  | 0.00950  | −0.00278 |
| 17 | −0.01190 | 0.05205  | −0.02530 | 0.04481  | −0.00542 | −0.00417 | 0.00608  |
| Σ  | −0.00147 | −0.00373 | 0.00055  | 0.03265  | −0.00276 | −0.00118 | 0.00088  |

TABLE 2(b)

|    | SA3      | CMA3     | AST3     | DIS3     | PTZ3     | SAC      | SLC      |
|----|----------|----------|----------|----------|----------|----------|----------|
| 1  | −0.14829 | 0.15008  | −0.01688 | 0.01176  | −0.01800 | −0.01540 | 0.00520  |
| 2  | −0.01645 | 0.07313  | −0.03613 | 0.05189  | 0.00112  | −0.00526 | 0.00779  |
| 3  | 0.00378  | 0.00484  | 0.00069  | −0.00551 | −0.01361 | −0.00380 | −0.00162 |
| 4  | −0.26545 | 0.73187  | −0.22420 | 0.20885  | −0.00305 | −0.01159 | 0.01065  |
| 5  | 0.32246  | −0.88035 | 0.26705  | −0.24709 | 0.00446  | 0.03933  | −0.03579 |
| 6  | −0.00430 | 0.03226  | −0.02689 | 0.04593  | 0.00853  | −0.00690 | 0.01725  |
| 7  | 0.00425  | −0.00058 | 0.00001  | 0.00123  | −0.02701 | −0.00868 | 0.00040  |
| 8  | −0.00338 | 0.03102  | −0.03160 | 0.04915  | 0.01552  | −0.00176 | 0.00538  |
| 9  | 0.07745  | −0.26589 | 0.10143  | −0.10974 | −0.00553 | 0.01990  | −0.02277 |
| 10 | −0.03703 | 0.08326  | −0.02080 | 0.01645  | −0.00114 | −0.01696 | 0.01271  |
| 11 | 0.05909  | 0.03967  | 0.00296  | 0.01116  | 0.04691  | 0.01589  | 0.00355  |
|    | 0.0      | 0.0      | 0.0      | 0.0      | 0.0      | 0.0      | 0.0      |
| 12 | −0.00026 | −0.00184 | −0.00146 | −0.05435 | −0.02136 | −0.00251 | −0.00597 |
| 13 | −0.00022 | 0.00549  | −0.01493 | 0.03667  | 0.01043  | −0.00061 | 0.00500  |
| 14 | 0.00809  | −0.03509 | 0.01691  | −0.02875 | 0.00298  | 0.00587  | −0.00848 |
| 15 | −0.10438 | 0.08881  | −0.00840 | 0.00850  | −0.02157 | −0.01461 | 0.00414  |
| 16 | 0.10906  | −0.08107 | 0.00670  | −0.00740 | 0.02317  | 0.00990  | −0.00245 |
| 17 | −0.00807 | 0.03369  | −0.01653 | 0.02696  | −0.00374 | −0.00386 | 0.00537  |
| Σ  | −0.00365 | 0.00929  | −0.00118 | 0.01571  | −0.00190 | −0.00106 | 0.00037  |

TABLE 3(a)

|    | SA3      | CMA3     | AST3     | DIS3     | PTZ3     | SAC      | SLC      |
|----|----------|----------|----------|----------|----------|----------|----------|
| 1  | −0.13701 | 0.04761  | −0.00184 | 0.00314  | −0.02523 | −0.01802 | 0.00209  |
| 2  | −0.01756 | 0.07677  | −0.03730 | 0.05031  | 0.00278  | −0.00617 | 0.00900  |
| 3  | 0.00555  | 0.00953  | 0.00182  | −0.01091 | −0.02089 | −0.00478 | −0.00273 |
| 4  | −0.43788 | 0.97427  | −0.24086 | 0.18267  | −0.00544 | −0.01467 | 0.01088  |
| 5  | 0.47936  | −1.07185 | 0.26630  | −0.20311 | 0.00622  | 0.04639  | −0.03458 |
| 6  | −0.00064 | 0.01145  | −0.02288 | 0.04140  | 0.01597  | −0.00284 | 0.01702  |
| 7  | 0.00061  | 0.00022  | 0.00001  | −0.00471 | −0.03872 | −0.01229 | −0.00149 |
| 8  | −0.02909 | 0.13034  | −0.06490 | 0.07147  | 0.01706  | −0.00557 | 0.00832  |
| 9  | 0.14653  | −0.40129 | 0.12211  | −0.10608 | −0.00591 | 0.02878  | −0.02628 |
| 10 | −0.05830 | 0.10617  | −0.02148 | 0.01416  | −0.00185 | −0.02346 | 0.01424  |
| 11 | 0.04685  | 0.07495  | 0.01332  | 0.04397  | 0.06914  | 0.01591  | 0.00848  |
|    | 0.0      | 0.0      | 0.0      | 0.0      | 0.0      | 0.0      | 0.0      |
| 12 | 0.00032  | 0.00603  | 0.01242  | −0.08530 | −0.02622 | −0.00113 | −0.00700 |
| 13 | −0.00579 | 0.03461  | −0.02297 | 0.03334  | 0.00623  | −0.00233 | 0.00465  |
| 14 | 0.00871  | −0.04273 | 0.02328  | −0.03207 | −0.00367 | 0.00384  | −0.00628 |
| 15 | −0.00022 | −0.00536 | −0.01428 | 0.14075  | 0.03189  | 0.00142  | 0.01135  |
| 16 | 0.00025  | 0.00572  | 0.01483  | −0.14818 | −0.03388 | −0.00219 | −0.01700 |
| 17 | −0.00393 | 0.03049  | −0.02631 | 0.04113  | 0.01042  | −0.00395 | 0.01024  |

TABLE 3(a)-continued

| | SA3 | CMA3 | AST3 | DIS3 | PTZ3 | SAC | SLC |
|---|---|---|---|---|---|---|---|
| Σ | −0.00223 | −0.01306 | 0.00126 | 0.03196 | −0.00208 | −0.00107 | 0.00090 |

TABLE 3(b)

| | SA3 | CMA3 | AST3 | DIS3 | PTZ3 | SAC | SLC |
|---|---|---|---|---|---|---|---|
| 1 | −0.09602 | 0.03169 | −0.00116 | 0.00189 | −0.01606 | −0.01445 | 0.00159 |
| 2 | −0.00780 | 0.03732 | −0.01984 | 0.02883 | 0.00177 | −0.00431 | 0.00687 |
| 3 | 0.00297 | 0.00453 | 0.00077 | −0.00638 | −0.01330 | −0.00410 | −0.00209 |
| 4 | −0.24132 | 0.54345 | −0.13598 | 0.10468 | −0.00346 | −0.01110 | 0.00833 |
| 5 | 0.26414 | −0.59802 | 0.15044 | −0.11652 | 0.00396 | 0.03512 | −0.02651 |
| 6 | −0.00007 | 0.00265 | −0.01194 | 0.02395 | 0.01017 | −0.00097 | 0.01306 |
| 7 | −0.00481 | −0.00163 | −0.00000 | −0.00279 | −0.02465 | −0.01017 | −0.00115 |
| 8 | −0.01338 | 0.06590 | −0.03606 | 0.04137 | 0.01086 | −0.00390 | 0.00640 |
| 9 | 0.07913 | −0.22334 | 0.07005 | −0.06237 | −0.00376 | 0.02191 | −0.02062 |
| 10 | −0.03434 | 0.06241 | −0.01260 | 0.00835 | −0.00118 | −0.01850 | 0.01121 |
| 11 | 0.04705 | 0.06719 | 0.01066 | 0.02602 | 0.04401 | 0.01405 | 0.00669 |
| | 0.0 | 0.0 | 0.0 | 0.0 | 0.0 | 0.0 | 0.0 |
| 12 | 0.00012 | 0.00129 | 0.00155 | −0.05485 | −0.01669 | −0.00164 | −0.00593 |
| 13 | −0.00245 | 0.01707 | −0.01320 | 0.02141 | 0.00397 | −0.00171 | 0.00396 |
| 14 | 0.00337 | −0.01836 | 0.01111 | −0.01592 | −0.00233 | 0.00232 | −0.00421 |
| 15 | −0.00007 | −0.00266 | −0.01207 | 0.11209 | 0.02030 | 0.00066 | 0.00903 |
| 16 | 0.00007 | 0.00287 | 0.01263 | −0.11779 | −0.02157 | −0.00103 | −0.01351 |
| 17 | −0.00160 | 0.01423 | −0.01411 | 0.02221 | 0.00664 | −0.00243 | 0.00723 |
| Σ | −0.00500 | 0.00660 | 0.00017 | 0.01418 | −0.00133 | −0.00023 | 0.00036 |

TABLE 4(a)

| | SA3 | CMA3 | AST3 | DIS3 | PTZ3 | SAC | SLC |
|---|---|---|---|---|---|---|---|
| 1 | −0.15284 | 0.14777 | −0.01587 | 0.01438 | −0.02875 | −0.02095 | 0.00675 |
| 2 | −0.03470 | 0.15358 | −0.07553 | 0.10618 | 0.00356 | −0.00858 | 0.01266 |
| 3 | 0.00480 | 0.01138 | 0.00300 | −0.01388 | −0.02056 | −0.00336 | −0.00266 |
| 4 | −0.53620 | 1.48601 | −0.45759 | 0.42769 | −0.00538 | −0.01549 | 0.01431 |
| 5 | 0.63890 | −1.76002 | 0.53871 | −0.50159 | 0.00753 | 0.04593 | −0.04218 |
| 6 | −0.00110 | −0.01024 | −0.01059 | 0.03350 | 0.02139 | 0.00392 | 0.01216 |
| 7 | −0.00666 | 0.00168 | −0.00005 | 0.00322 | −0.03826 | −0.01140 | 0.00096 |
| 8 | −0.05496 | 0.23417 | −0.11086 | 0.13870 | 0.01320 | −0.00674 | 0.00958 |
| 9 | 0.14160 | −0.47722 | 0.17870 | −0.19374 | −0.00625 | 0.02791 | −0.03135 |
| 10 | −0.05797 | 0.14039 | −0.03777 | 0.03201 | −0.00188 | −0.02312 | 0.01866 |
| 11 | 0.05556 | 0.05335 | 0.00569 | 0.02471 | 0.07149 | 0.01628 | 0.00521 |
| | 0.0 | 0.0 | 0.0 | 0.0 | 0.0 | 0.0 | 0.0 |
| 12 | 0.00038 | 0.00384 | 0.00429 | −0.10057 | −0.03424 | −0.00215 | −0.00723 |
| 13 | −0.00055 | 0.01149 | −0.02647 | 0.06176 | 0.01753 | −0.00084 | 0.00582 |
| 14 | 0.00359 | −0.03160 | 0.03089 | −0.05949 | −0.01060 | 0.00277 | −0.00812 |
| 15 | −0.00027 | −0.00411 | −0.00701 | 0.14331 | 0.03505 | 0.00224 | 0.01144 |
| 16 | 0.00020 | 0.00347 | 0.00660 | −0.13083 | −0.02955 | −0.00255 | −0.01454 |
| 17 | −0.00604 | 0.03721 | −0.02548 | 0.04593 | 0.00312 | −0.00448 | 0.00920 |
| Σ | −0.00626 | 0.00115 | 0.00067 | 0.03130 | −0.00261 | −0.00061 | 0.00067 |

TABLE 4(b)

| | SA3 | CMA3 | AST3 | DIS3 | PTZ3 | SAC | SLC |
|---|---|---|---|---|---|---|---|
| 1 | −0.14073 | 0.11580 | −0.01059 | 0.00840 | −0.02003 | −0.01925 | 0.00528 |
| 2 | −0.02144 | 0.09110 | −0.04302 | 0.05743 | 0.00248 | −0.00700 | 0.00992 |
| 3 | 0.00421 | 0.00766 | 0.00155 | −0.00775 | −0.01433 | −0.00343 | −0.00208 |
| 4 | −0.39050 | 0.97909 | −0.27276 | 0.23110 | −0.00375 | −0.01345 | 0.01124 |
| 5 | 0.46635 | −1.16157 | 0.32147 | −0.27126 | 0.00525 | 0.03997 | −0.03318 |
| 6 | −0.00142 | −0.00840 | −0.00553 | 0.01851 | 0.01491 | 0.00485 | 0.00958 |
| 7 | −0.01316 | 0.00276 | −0.00006 | 0.00187 | −0.02666 | −0.01080 | 0.00076 |
| 8 | −0.03545 | 0.14415 | −0.06512 | 0.07580 | 0.00920 | −0.00558 | 0.00756 |
| 9 | 0.10022 | −0.31211 | 0.10800 | −0.10759 | −0.00435 | 0.02434 | −0.02527 |
| 10 | −0.04486 | 0.09710 | −0.02335 | 0.01779 | −0.00131 | −0.02090 | 0.01508 |
| 11 | 0.07174 | 0.05514 | 0.00471 | 0.01397 | 0.04981 | 0.01647 | 0.00422 |
| | 0.0 | 0.0 | 0.0 | 0.0 | 0.0 | 0.0 | 0.0 |
| 12 | −0.00116 | −0.00732 | −0.00512 | −0.06077 | −0.02386 | −0.00300 | −0.00630 |
| 13 | −0.00005 | 0.00259 | −0.01445 | 0.03748 | 0.01222 | −0.00030 | 0.00510 |
| 14 | 0.00175 | −0.01632 | 0.01694 | −0.02974 | −0.00739 | 0.00187 | −0.00582 |
| 15 | −0.00013 | −0.00321 | −0.00865 | 0.12773 | 0.02442 | 0.00123 | 0.00995 |
| 16 | 0.00010 | 0.00260 | 0.00792 | −0.11564 | −0.02059 | −0.00137 | −0.01255 |
| 17 | −0.00280 | 0.01757 | −0.01227 | 0.02116 | 0.00217 | −0.00295 | 0.00168 |
| Σ | −0.00733 | 0.00663 | −0.00034 | 0.01850 | −0.00182 | 0.00068 | −0.00033 |

Out of the tables shown in the above, Tables 1(a) and 1(b) respectively show aberration coefficients of Embodiment 1 when focused on an object at the infinite distance and when focused on an object at the magnification of −1/10. In the same way as above, Tables 2(a) and 2(b) respectively show aberration coefficitents of Embodiment 2 when focused on an object at the infinite distance and when focused on an object at the magnification of −1/10, Tables 3(a) and 3(b) respectively show aberration coefficients of Embodiment 3 when focused on an object at the infinite distnace and when focused on an object at the magnification of −1/10, and Tables 4(a) and 4(b) respectively show aberration coefficients of Embodiment 4 when focused on an object at the infinite distnace and when focused on an object at the magnification of −1/10. In said tables, reference symbol SA3 represents aberration coefficients of spherical aberration, reference symbol CMA3 represents aberration coefficients of coma, reference symbol AST3 represents aberration coefficients of astigmatism, reference symobl DIS3 represents aberration coefficients of distortion, reference symbol PTZ3 represents aberration coefficients of Petzval's sum, reference symbol SAC represents aberration coefficients of paraxial chromatic aberration, and reference symbol SLC represents aberration coefficients of offaxial chromatic aberration.

As described so far and as it will be evident from respective embodiments, the present invention provides a telephoto lens system which is small in size and of which chromatic aberration, especially the secondary spectrum, is made small by adopting adequate distribution of refractive power and adequate lens configuration and by adequate selection of glass materials for respective lenses. Besides, by adopting the focusing method which is suitable for maintaining the optical performance and operability, the telephoto lens system according to the present invention is arranged to be small in size and arranged that the quality of image is extremely high and, moreover, the variation of aberrations is small when focusing from an object at the infinite distance onto an object at a short distnace. Furthermore, as respective lens components constituting the third lens unit III and the fourth lens unit IV are arranged that refractive powers thereof are weak, the influence of errors in the manufacture to be exerted on the lens system is small, and this is desirable for the manufacture of lenses. Besides, when the telephoto lens system according to the present invention is arranged that the fourth lens unit IV has negative refractive power, it is possible to make the advancing amount of lens units at the time of focusing small.

I claim:

1. A telephoto lens system comprising, in the order from the object side, a first lens unit having positive refractive power comprising at least one positive lens component and at least one negative lens component, a second lens unit having negative refractive power, a third lens unit having positive refractive power, and a fourth lens unit consisting of a positive lens component and a negative lens component, wherein said telephoto lens system is arraned to be focused by integrally moving said first lens unit through said third lens unit along the optical axis and is arranged to fulfill the conditions (1) through (7) shown below, said telephoto lens system being small in size and having high performance:

$$0.35 < f_I/f < 0.5 \tag{1}$$

$$0.9 < \beta_{IV} < 1.2 \tag{2}$$

$$1.21 \leq \theta_{Ip} 23\ 1.29,\ 60 \leq \nu_{Ip} \leq 95.5 \tag{3}$$

$$25 < \nu_{In} < 40 \tag{4}$$

$$1.43 < n_{Ip} < 1.65 \tag{5}$$

$$1.6 < n_{In} < 1.9 \tag{6}$$

$$0.1 < r_{IVa}/r_{IVb} < 1.3 \tag{7}$$

where, reference symbol f represents the focal length of the lens system as a whole, reference symbol $f_I$ represents the focal length of the first lens unit, reference symbol $\beta_{IV}$ represents the lateral magnification of the fourth lens unit when said telephoto lens system is focused on an object at the infinite distance, reference symbol $\theta_{Ip}$ represents the partial dispersion ratio of said at least one positive lens component in the first lens unit, reference symbol $\nu_{Ip}$ represents Abbe's number of said positive lens component in the first lens unit for d-line, reference symbol $\nu_{In}$ represents Abbe's number of said negative lens component in the first lens unit for d-line, reference symbol $n_{Ip}$ represents the refractive index of said positive lens component in the first lens unit for d-line, reference symbol $n_{In}$ represents the refractive index of said negative lens component in the first lens unit for d-line, reference symbol $r_{IVa}$ represents the radius of curvature of the surface on the negative lens component side of said positive lens component in the fourth lens unit, and reference symbol $r_{IVb}$ represents the radius of curvature of the surface on the positive lens component side of each negative lens component in fourth lens unit.

2. A telephoto lens system according to claim 1 wherein said first lens unit comprises, in the order from the object side, two positive lens components, a biconcave lens component, and a positive meniscus lens component having a convex surface on the object side, said second lens unit comprises a cemented doublet consisting of a positive lens element and a biconcave lens element, said third lens unit comprises at least one positive lens component, and said fourth lens unit comprises a positive lens component and a negative lens component, wherein each said positive lens component of said first lens unit satisfies the conditions numbered 3 and 5.

3. A telephoto lens system according to claim 2 further fulfilling the condition (8) shown below:

$$(\theta_{IIn} - \theta_{IIp})/(\nu_{IIn} - \nu_{IIp}) < -0.0031 \tag{8}$$

where, reference symbol $\theta_{IIn}$ represents the partial dispersion ratio of the biconcave lens element in the second lens unit, reference symbol $\theta_{IIp}$ represents the partial dispersion ratio of the positive lens element in the second lens unit, reference symbol $\nu_{IIn}$ represents Abbe's number of the biconcave lens element in the second lens unit for d-line, and reference symbol $\nu_{IIp}$ represents Abbe's number of the positive lens element in the second lens unit for d-line.

4. A telephoto lens system according to claim 3 wherein said fourth lens unit comprises a positive meniscus lens component having a convex surface on the image side, and a negative meniscus lens component having a concave surface on the object side, and said telephoto lens system has the following numerical data:

| f = 100, F/3.6, 2ω = 14° telephoto ratio 0.857 | | | |
|---|---|---|---|
| $r_1 = 37.011$ | | | |
| $d_1 = 3.92$ | | $n_1 = 1.48749$ | $\nu_1 = 70.15$ |
| $r_2 = 728.935$ | | | |
| $d_2 = 0.17$ | | | |
| $r_3 = 44.498$ | | | |
| $d_3 = 3.98$ | | $n_2 = 1.45600$ | $\nu_2 = 90.31$ |

-continued

| f = 100, F/3.6, 2ω = 14° telephoto ratio 0.857 | | | |
|---|---|---|---|
| $r_4 = -192.731$ | | | |
| $d_4 = 0.91$ | | | |
| $r_5 = -177.214$ | | | |
| $d_5 = 1.65$ | $n_3 = 1.67270$ | $\nu_3 = 32.1$ | |
| $r_6 = 84.509$ | | | |
| $d_6 = 0.17$ | | | |
| $r_7 = 26.500$ | | | |
| $d_7 = 2.67$ | $n_4 = 1.48749$ | $\nu_4 = 70.15$ | |
| $r_8 = 54.802$ | | | |
| $d_8 = 10.17$ | | | |
| $r_9 = 185.681$ | | | |
| $d_9 = 1.99$ | $n_5 = 1.80518$ | $\nu_5 = 25.43$ | |
| $r_{10} = -105.924$ | | | |
| $d_{10} = 0.97$ | $n_6 = 1.61250$ | $\nu_6 = 44.90$ | |
| $r_{11} = 16.356$ | | | |
| $d_{11} = 18.26$ | | | |
| $r_{12} = 32.629$ | | | |
| $d_{12} = 1.59$ | $n_7 = 1.51728$ | $\nu_7 = 69.56$ | |
| $r_{13} = 86.198$ | | | |
| $d_{13} = 2.16 \sim 10.71$ | | | |
| $r_{14} = -162.379$ | | | |
| $d_{14} = 1.65$ | $n_8 = 1.66446$ | $\nu_8 = 35.71$ | |
| $r_{15} = -36.411$ | | | |
| $d_{15} = 0.91$ | | | |
| $r_{16} = -33.495$ | | | |
| $d_{16} = 0.97$ | $n_9 = 1.67790$ | $\nu_9 = 50.72$ | |
| $r_{17} = -206.402$ | | | |
| $f_I/f = 0.435$, $f_{IV} = -390.27$ | | | |
| $\theta_{Ip1} = 1.2212$, $\theta_{Ip2} = 1.2277$, $\theta_{Ip3} = 1.2212$ | | | |
| $\nu_{Ip1} = 70.15$, $\nu_{Ip2} = 90.31$, $\nu_{Ip3} = 70.15$ | | | |
| $\nu_{In} = 32.1$, $n_{Ip1} = 1.48749$, $n_{Ip2} = 1.45600$ | | | |
| $n_{Ip3} = 1.48749$, $n_{In} = 1.67270$ | | | |
| $(\theta_{IIn} - \theta_{IIp})/(\nu_{IIn} - \nu_{IIp}) = -0.00343$ | | | |
| $r_{IVa}/r_{IVb} = 1.087$, $\beta_{IV} = 1.081$ | | | | where, reference symbols $r_1$ through $r_{17}$ respectively represent radii of curvature of respective lens surfaces, reference symbols $d_1$ through $d_{16}$ respectively represent thicknesses of respective lens and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

5. A telephoto lens system according to claim 3 wherein said fourth lens unit comprises a positive meniscus lens component having a convex surface on the image side, and a negative meniscus lens component having a concave surface on the object side, and said telephoto lens system has the following numerical data:

| f = 100, F/3.6, 2ω = 14° telephoto ratio 0.86 | | | |
|---|---|---|---|
| $r_1 = 36.625$ | | | |
| $d_1 = 3.96$ | $n_1 = 1.48749$ | $\nu_1 = 70.15$ | |
| $r_2 = 586.183$ | | | |
| $d_2 = 0.11$ | | | |
| $r_3 = 48.338$ | | | |
| $d_3 = 4.83$ | $n_2 = 1.48605$ | $\nu_2 = 81.81$ | |
| $r_4 = -215.527$ | | | |
| $d_4 = 0.91$ | | | |
| $r_5 = -183.687$ | | | |
| $d_5 = 1.69$ | $n_3 = 1.68852$ | $\nu_3 = 30.62$ | |
| $r_6 = 96.184$ | | | |
| $d_6 = 0.11$ | | | |
| $r_7 = 25.745$ | | | |
| $d_7 = 2.57$ | $n_4 = 1.52855$ | $\nu_4 = 76.96$ | |
| $r_8 = 44.818$ | | | |
| $d_8 = 10.17$ | | | |
| $r_9 = 156.431$ | | | |
| $d_9 = 1.62$ | $n_5 = 1.75520$ | $\nu_5 = 27.51$ | |
| $r_{10} = -88.066$ | | | |
| $d_{10} = 0.49$ | $n_6 = 1.61340$ | $\nu_6 = 43.84$ | |
| $r_{11} = 16.301$ | | | |
| $d_{11} = 18.27$ | | | |
| $r_{12} = 32.062$ | | | |
| $d_{12} = 1.25$ | $n_7 = 1.51633$ | $\nu_7 = 64.15$ | |
| $r_{13} = 65.677$ | | | |
| $d_{13} = 2.10 \sim 12.12$ | | | |
| $r_{14} = -262.677$ | | | |
| $d_{14} = 1.31$ | $n_8 = 1.63636$ | $\nu_8 = 35.37$ | |
| $r_{15} = -36.253$ | | | |
| $d_{15} = 0.57$ | | | |
| $r_{16} = -33.05$ | | | |
| $d_{16} = 0.74$ | $n_9 = 1.61484$ | $\nu_9 = 51.17$ | |
| $r_{17} = -204.796$ | | | |
| $f_I/f = 0.437$, $f_{IV} = -3049.23$ | | | |
| $\theta_{Ip1} = 1.2212$, $\theta_{Ip2} = 1.2321$, $\theta_{Ip3} = 1.2362$ | | | |
| $\nu_{Ip1} = 70.15$, $\nu_{Ip2} = 81.81$, $\nu_{Ip3} = 76.96$ | | | |
| $\nu_{In} = 30.62$, $n_{Ip1} = 1.48749$, $n_{Ip2} = 1.48605$ | | | |
| $n_{Ip3} = 1.52855$, $n_{In} = 1.68852$ | | | |
| $(\theta_{IIn} - \theta_{IIp})/(\nu_{IIn} - \nu_{IIp}) = -0.00324$ | | | |
| $r_{IVa}/r_{IVb} = 1.097$, $\beta_{IV} = 1.006$ | | | | where, reference symbols $r_1$ through $r_{17}$ respectively represent radii of curvature of respective lens surfaces, reference symbols $d_1$ through $d_{16}$ respectively represent thicknesses of respective lenses and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

6. A telephoto lens system according to claim 3 wherein said fourth lens unit comprises a positive meniscus lens component having a convex surface on the image side, and a negative meniscus lens component having a concave surface on the object side, and said telephoto lens system has following numerical data:

| f = 100, F/3.6, 2ω = 12.6° telephoto ratio 0.86 | | | |
|---|---|---|---|
| $r_1 = 38.086$ | | | |
| $d_1 = 3.92$ | $n_1 = 1.48749$ | $\nu_1 = 70.15$ | |
| $r_2 = 722.344$ | | | |
| $d_2 = 0.17$ | | | |
| $r_3 = 44.341$ | | | |
| $d_3 = 3.98$ | $n_2 = 1.49700$ | $\nu_2 = 81.61$ | |
| $r_4 = -184.266$ | | | |
| $d_4 = 0.91$ | | | |
| $r_5 = -169.021$ | | | |
| $d_5 = 1.65$ | $n_3 = 1.67270$ | $\nu_3 = 32.10$ | |
| $r_6 = 74.825$ | | | |
| $d_6 = 0.17$ | | | |
| $r_7 = 26.266$ | | | |
| $d_7 = 2.67$ | $n_4 = 1.48749$ | $\nu_4 = 70.15$ | |
| $r_8 = 56.149$ | | | |
| $d_8 = 10.17$ | | | |
| $r_9 = 200.934$ | | | |
| $d_9 = 1.73$ | $n_5 = 1.80518$ | $\nu_5 = 25.43$ | |
| $r_{10} = -93.087$ | | | |
| $d_{10} = 0.97$ | $n_6 = 1.61250$ | $\nu_6 = 44.9$ | |
| $r_{11} = 16.424$ | | | |
| $d_{11} = 18.28$ | | | |
| $r_{12} = 34.3$ | | | |
| $d_{12} = 1.59$ | $n_7 = 1.48749$ | $\nu_7 = 70.15$ | |
| $r_{13} = 104.99$ | | | |
| $d_{13} = 2.16 \sim 10.81$ | | | |
| $r_{14} = -180.05$ | | | |
| $d_{14} = 1.65$ | $n_8 = 1.63636$ | $\nu_8 = 35.37$ | |
| $r_{15} = -35.61$ | | | |
| $d_{15} = 0.91$ | | | |
| $r_{16} = -33.61$ | | | |
| $d_{16} = 0.97$ | $n_9 = 1.67790$ | $\nu_9 = 50.72$ | |
| $r_{17} = -213.17$ | | | |
| $f_I/f = 0.424$, $f_{IV} = -428.8$ | | | |
| $\theta_{Ip1} = 1.2212$, $\theta_{Ip2} = 1.2319$, $\theta_{Ip3} = 1.2212$ | | | |

-continued $$f = 100, F/3.6, 2\omega = 12.6°$$
telephoto ratio 0.86

$\nu_{Ip1} = 70.15$, $\nu_{Ip2} = 81.61$, $\nu_{Ip3} = 70.15$
$\nu_{In} = 32.1$, $n_{Ip1} = 1.48749$, $n_{Ip2} = 1.49700$
$n_{Ip3} = 1.48749$, $n_{In} = 1.67270$
$(\theta_{IIn} - \theta_{IIp})/(\nu_{IIn} - \nu_{IIp}) = -0.00343$
$r_{IVa}/r_{IVb} = 1.059$, $\beta_{IV} = 1.075$ where, reference symbols $r_1$ through $r_{17}$ respectively represent radii of curvature of respective lens surfaces, reference symbols $d_1$ through $d_{16}$ respdctively represent thicknesses of respective lenses and airspaces between respective lenses, reference symbols $n_1$ through $n_9$ respectively represent refractive indices of respective lenses, and reference symbols $\nu_1$ through $\nu_9$ resepctively Abbe's numbers of respective lenses.

7. A telephoto lens system according to claim 3 wherein said fourth lens unit comprises a negative meniscus lens component having a concave surface on the image side, and a positive meniscus lens component having a convex surface on the object side, and said telephoto lens system has the following numerical data:

$$f = 100, F/3.6, 2\omega = 14°$$
telephoto ratio 0.853

| | | |
|---|---|---|
| $r_1 = 38.488$ | | |
| $d_1 = 3.62$ | $n_1 = 1.61800$ | $\nu_1 = 63.38$ |
| $r_2 = 310.663$ | | |
| $d_2 = 0.12$ | | |
| $r_3 = 46.786$ | | |
| $d_3 = 4.11$ | $n_2 = 1.49700$ | $\nu_2 = 81.61$ |
| $r_4 = -178.696$ | | |
| $d_4 = 0.91$ | | |
| $r_5 = -161.08$ | | |

-continued $$f = 100, F/3.6, 2\omega = 14°$$
telephoto ratio 0.853

| | | |
|---|---|---|
| $d_5 = 1.59$ | $n_3 = 1.72047$ | $\nu_3 = 34.72$ |
| $r_6 = 56.714$ | | |
| $d_6 = 0.17$ | | |
| $r_7 = 25.82$ | | |
| $d_7 = 2.84$ | $n_4 = 1.51728$ | $\nu_4 = 69.56$ |
| $r_8 = 74.838$ | | |
| $d_8 = 10.14$ | | |
| $r_9 = 206.927$ | | |
| $d_9 = 1.62$ | $n_5 = 1.80518$ | $\nu_5 = 25.43$ |
| $r_{10} = -101.213$ | | |
| $d_{10} = 0.92$ | $n_6 = 1.61340$ | $\nu_6 = 43.84$ |
| $r_{11} = 15.409$ | | |
| $d_{11} = 17.97$ | | |
| $r_{12} = 28.811$ | | |
| $d_{12} = 1.59$ | $n_7 = 1.51633$ | $\nu_7 = 64.15$ |
| $r_{13} = 56.276$ | | |
| $d_{13} = 2.07 \sim 12.35$ | | |
| $r_{14} = 114.385$ | | |
| $d_{14} = 1.05$ | $n_8 = 1.72000$ | $\nu_8 = 50.25$ |
| $r_{15} = 34.602$ | | |
| $d_{15} = 0.45$ | | |
| $r_{16} = 36.485$ | | |
| $d_{16} = 1.48$ | $n_9 = 1.59270$ | $\nu_9 = 35.29$ |
| $r_{17} = 346.055$ | | |

$f_I/f = 0.423$, $f_{IV} = 7086.13$
$\theta_{Ip1} = 1.2401$, $\theta_{Ip2} = 1.2319$, $\theta_{Ip3} = 1.2254$
$\nu_{Ip1} = 63.38$, $\nu_{Ip2} = 81.61$, $\nu_{Ip3} = 69.56$
$\nu_{In} = 34.72$, $n_{Ip1} = 1.61800$, $n_{Ip2} = 1.49700$
$n_{Ip3} = 1.51728$, $n_{In} = 1.72047$
$(\theta_{IIn} - \theta_{IIp})/(\nu_{IIn} - \nu_{IIp}) = -0.00324$
$r_{IVa}/r_{IVb} = 1.054$, $\beta_{IV} = 0.9961$ where, reference symbols $r_1$ through $r_{17}$ respectively represent radii of curvature of respective lens surfaces, reference symbols $d_1$ through $d_{16}$ respectively represent thickness of respective lenses and airspaces between respective lenses, reference symbols $n_1$ through $n_9$ respectively represent refractive indices of respective lenses, and reference symbols $\nu_1$ through $\nu_9$ respectively represent Abbe's numbers of respective lenses.

* * * * *